United States Patent [19]

Mitsui et al.

[11] Patent Number: 5,521,353
[45] Date of Patent: May 28, 1996

[54] WELDING ROBOT

[75] Inventors: Noboru Mitsui; Masahiro Kajiyama; Masahiro Ohno, all of Iwata, Japan

[73] Assignee: Yamaha Hatsudoki Kabushiki Kaisha, Iwata, Japan

[21] Appl. No.: 400,183

[22] Filed: Mar. 6, 1995

Related U.S. Application Data

[63] Continuation of Ser. No. 103,354, Aug. 9, 1993, abandoned.

[30] Foreign Application Priority Data

Aug. 10, 1992 [JP] Japan .................................. 4-232673

[51] Int. Cl.$^6$ .................................................. B23K 9/007
[52] U.S. Cl. .................. 219/127; 219/125.1; 219/137 R
[58] Field of Search ............................ 219/127, 130.01, 219/137 R, 125.1

[56] References Cited

U.S. PATENT DOCUMENTS 3,686,463  8/1972  Charlesworth .......................... 219/127
4,103,141  7/1978  Wristen ................................ 219/130.01

FOREIGN PATENT DOCUMENTS 2410866  9/1975  Germany .............................. 219/127

Primary Examiner—Clifford C. Shaw
Attorney, Agent, or Firm—Knobbe, Martens, Olson & Bear

[57] ABSTRACT

A welding apparatus and method for forming arc welds of thin sheet material. The apparatus forms a first pool of molten material and then discontinues the welding to permit a portion of that pool to solidify and then reestablishes a new arc at point along the periphery of the solidified previous pool and continuing this operation to form the finished weld bead. Thus, lower welding heats may be employed and greater tolerance in the welding method and apparatus is possible.

14 Claims, 6 Drawing Sheets

| JOINT TYPE | SKETCH OF CROSS SECTION | GAP (in mm) (Aimed on C/L) | | AIMED POSITION (in mm) (without gap) | |
|---|---|---|---|---|---|
| | | NORMAL | STITCH PULSE | NORMAL | STITCH PULSE |
| BUTT JOINT | t0.8  t0.8  (−) C/L (+) | ✗ | ○ UP TO 0.5mm | ○ UP TO ±0.5 | ○ UP TO ±0.5 |
| | t1.6  t0.8  (−) C/L (+) | ✗ | ○ UP TO 0.5mm | ○ UP TO ±0.5 | ○ UP TO ±0.5 |
| LAP JOINT | t1.6  t0.8  (−) C/L (+) | △ 0–1.0mm | ○ | ○ −0.5 only | ○ UP TO ±0.5 |
| | t1.6  t0.8  (−) C/L (+) | | | △ −0.5 only | ✗ UP TO ±0.5 |

Figure 10

WELDING ROBOT

This application is a continuation of application Ser. No. 08/103,354, filed Aug. 9, 1993, now abandoned.

BACKGROUND OF THE INVENTION

This invention relates to a welding robot and more particularly to an improved apparatus and method for arc welding thin sheets of metal.

A variety of automatic welding devices have been proposed for arc welding, a most common type being the MAG welders that provide automatic gas shielded arc welding and which have welding torch which is moved along the seam to be welded by a robot with the speed of motion, diameter of weld rod, welding current and other factors being controlled in accordance with the thickness of the materials being welded. When butt welding, the two materials to be joined have their edges positioned in abutting relationship and the weld rod or wire is fed along the direction of the butted joint.

However, this type of apparatus presents certain problems in connection with welding thin sheets of material. If the edges to be jointed are not completely straight and in abutting relationship without any gaps, then the amount of welding heat can be too great for the thickness of the material and voids in the weld can occur. This is because the molten metal can fall through the gap between the edges of the material being welded. Although this can be avoided by using very sensitive welding techniques and also by assuring extreme accuracy in the edges being joined, such complicated systems and the provision of such high accuracies in forming the edges to be welded significantly increase the cost of the apparatus and reduces the efficiency of the welding technique.

It is, therefor, a principal object of this invention to provide an improved apparatus and method for welding thin sheets of material.

It is a further object of this invention to provide an improved method and apparatus for arc welding joining edges of thin sheets of material.

SUMMARY OF THE INVENTION

This invention is adapted to be embodied in a method and apparatus for arc welding thin pieces of material using an arc welder that is supported for movement along the seam to be welded. In accordance with both the method and apparatus an arc is struck in the area to be welded and a pool of molten material is formed. The welding is then suspended for a time period so as to permit the pool to partially solidify. A further arc is then establish at a point spaced from the first arc and containing the periphery of the first pool to form a second pool and this procedure is continued along the seam until the weld is completed.

BRIEF DESCRIPTION OF THE DRAWINGS

FIG. 10 is a table showing a comparison of the weld between thin sheets of metal with various welding methods and applied to butt or lap type joints.

DETAILED DESCRIPTION OF THE PREFERRED EMBODIMENTS OF THE INVENTION

Figure 1:
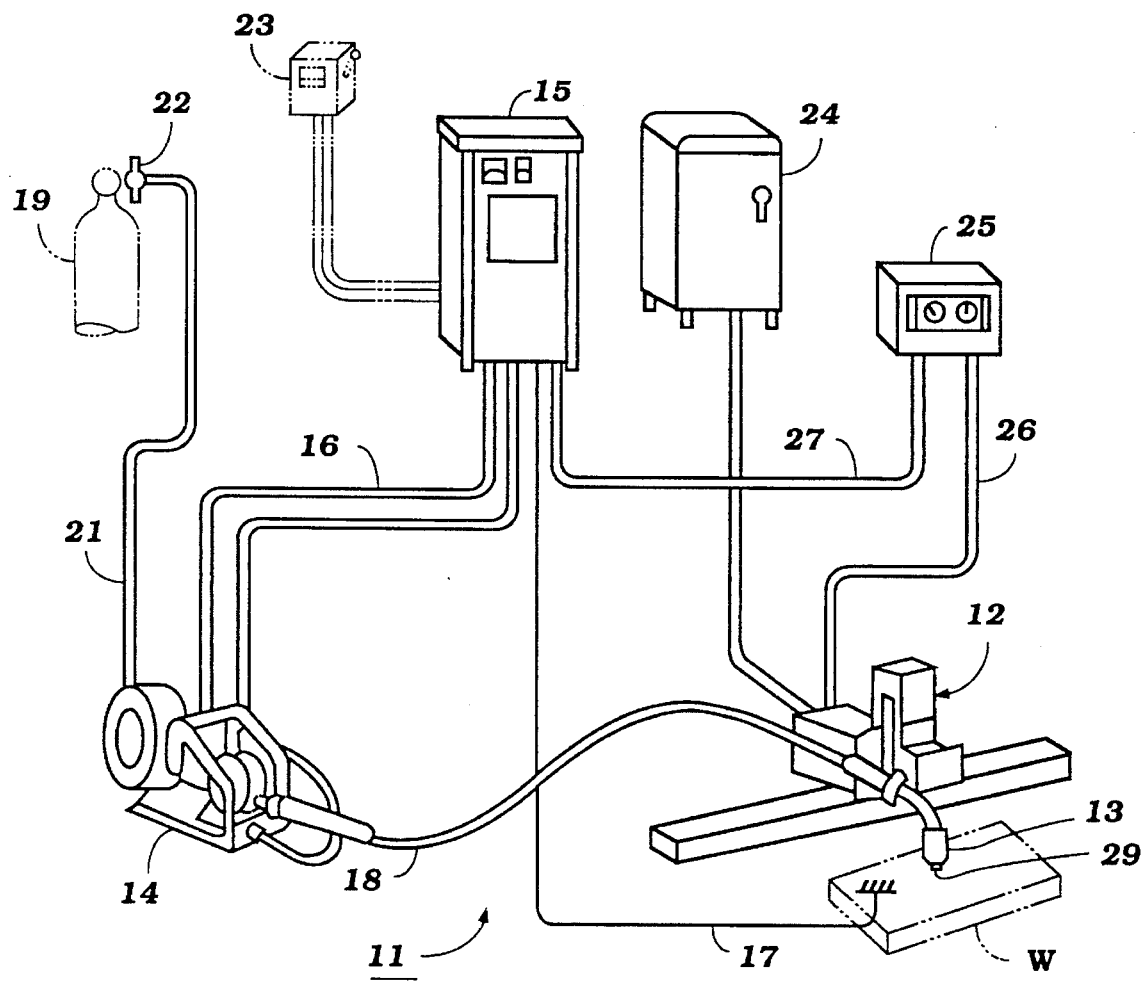
FIG. 1 is a perspective, partially schematic view of a welding apparatus constructed and operated in accordance with an embodiment of the invention.

Referring first to FIG. 1, a welding apparatus constructed and operated in accordance with an embodiment of the invention is identified generally by the reference numeral 11. As will be described, a major portion of the welding apparatus 11 is conventional and those conventional components will be described first. The apparatus 11 is designed and construction so as to perform welds along a work piece indicated by the reference character W and shown in phantom in this Figure.

The welding apparatus 11 includes a robot 12 that carries a welding head 13 and which is supported for controlled movement to move along the pre-determined path which will determine the weld bead established on the work piece W. The welding head 13 is of a conventional MAG automatic welder that receives a weld rod in the form of a wire from a wire feeder 14. This wire is also supplied with electrical current from a power source 15 through a conductor 16. In addition, a ground conductor 17 is connected to the work piece W so as to complete the normal circuit.

The wire from the feeder 14 is delivered to the head 13 through a conduit 18. The conduit 18 also provides a path for shield gas from a remote shield gas supply, shown partially in phantom and identified by the reference numeral 19. A conduit 21 extends from a regulator 22 on the supply 19 to the conduit 18 so as to provide the gas shield in a well known manner.

A main power supply, shown in phantom, 23 supplies electrical power to the welding transformer and welding control 15 in a well known manner.

In a similar manner, the robot 12 is controlled by a controller 24 that controls the time of movement of the welding head 13 and also the path of movement of the robot 12. As has been noted, this construction is well known in the prior art and, for that reason, further detailed description of it is not believe to be necessary.

Figure 7:
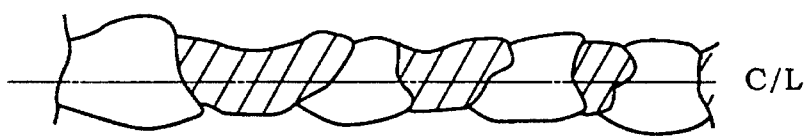
FIG. 7 is a top plan view, in part similar to FIG. 5, and shows the type the weld that occurs with a prior art type of method and apparatus.

A problem with this type of prior art construction may be understood by reference to FIG. 7 which shows a weld joint between thin pieces of sheet metal when an attempt is made to weld them the prior art apparatus and method. The shaded areas in this Figure show areas where the weld will be incomplete due to the generation of excess heat which causes the molten material to fall through gaps which are either existent or will occur between the edges of the material being welded. The unshaded areas show the areas wherein bonds will be formed without voids. This irregular bead occurs due to the inability to control the heat and speed of the welding head at any reasonable cost and still permit high production efficiencies.

Therefor, in accordance with the invention there is provided a switch pulse controller, indicated generally by the reference numeral 25 that has a control 26 that goes to the robot 12 so as to cause it to move not a uniform speed but to move at step function as will be described. Of course, during the actual movement the speed may be uniform. In addition, a conductor 27 is connected to the welding controller 15 so as to switch the welding current on and off or increase and decrease it to make and break the arc, also in a manner to be described. Thus the weld is made in a step function rather than continuously. Although the pulse controller 25 is depicted as being a separate element, it is to be understood that it can be incorporated either completely in the welding controller 15 or in the robot controller 24 or portions of it can be provided in each of these units with the units being interrelated.

Basically the function of the switch pulse controller 25 is to first establish a weld arc and form a pool of molten material. The continued melting is then stopped to permit a portion of the pool to solidify and the welding head 13 is advanced to an area at the periphery of the solidified pool to again strike an arc and begin forming a new puddle of molten material. In this way, rather than continuing to form a molten pool as the weld head 13 moves along and requiring continuous supply of heat and more difficult control, the unit operates in an on off manner so as to reduce the total heat supplied to the base material W and thus avoid the defects of the prior art type of construction.

Figure 8:
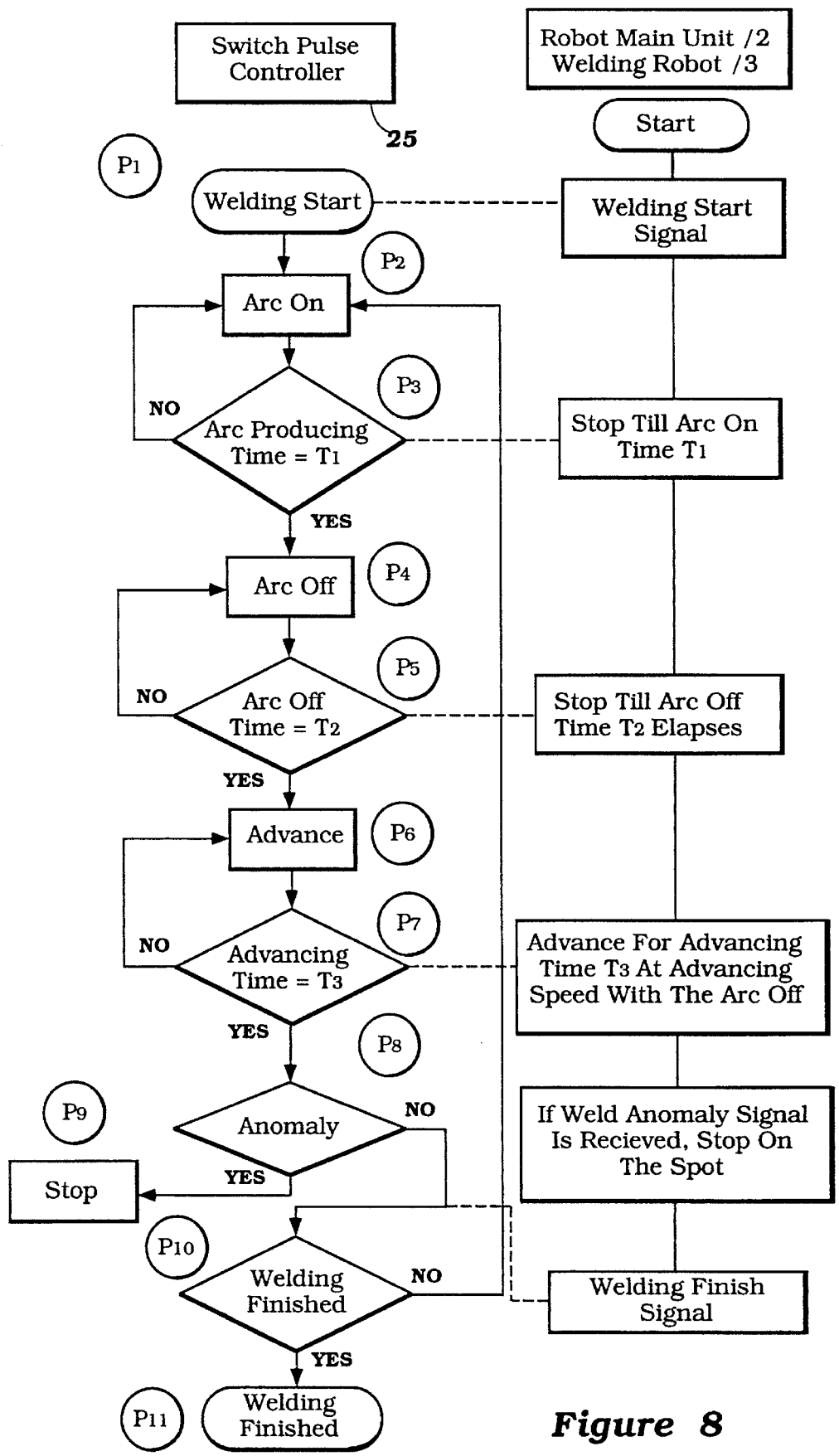
FIG. 8 is a block diagram showing one control routine in accordance with the invention.

The effect of this will now be described by particular reference to FIGS. 2–6 with the method being described in conjunction with the control routine of FIG. 8. It should be noted that FIG. 8 shows both the operation of the switch pulse controller 25 and the related operations of both the welding head 13 and the robot 12. At the beginning and at the first step P-1 the switch pulse controller 25 initiates welding and this signal is transmitted to the controller 15 and also at this time the robot controller 24 is held in its position. To initiate welding, the welding current as supplied is shown at the top view of FIG. 2 and the welding current initially started is greater than a pre-determined value I so as to strike the arc. Once the arc is struck, the welding current is dropped to the predetermined value I so as to control the amount of heat supplied.

Figure 2:
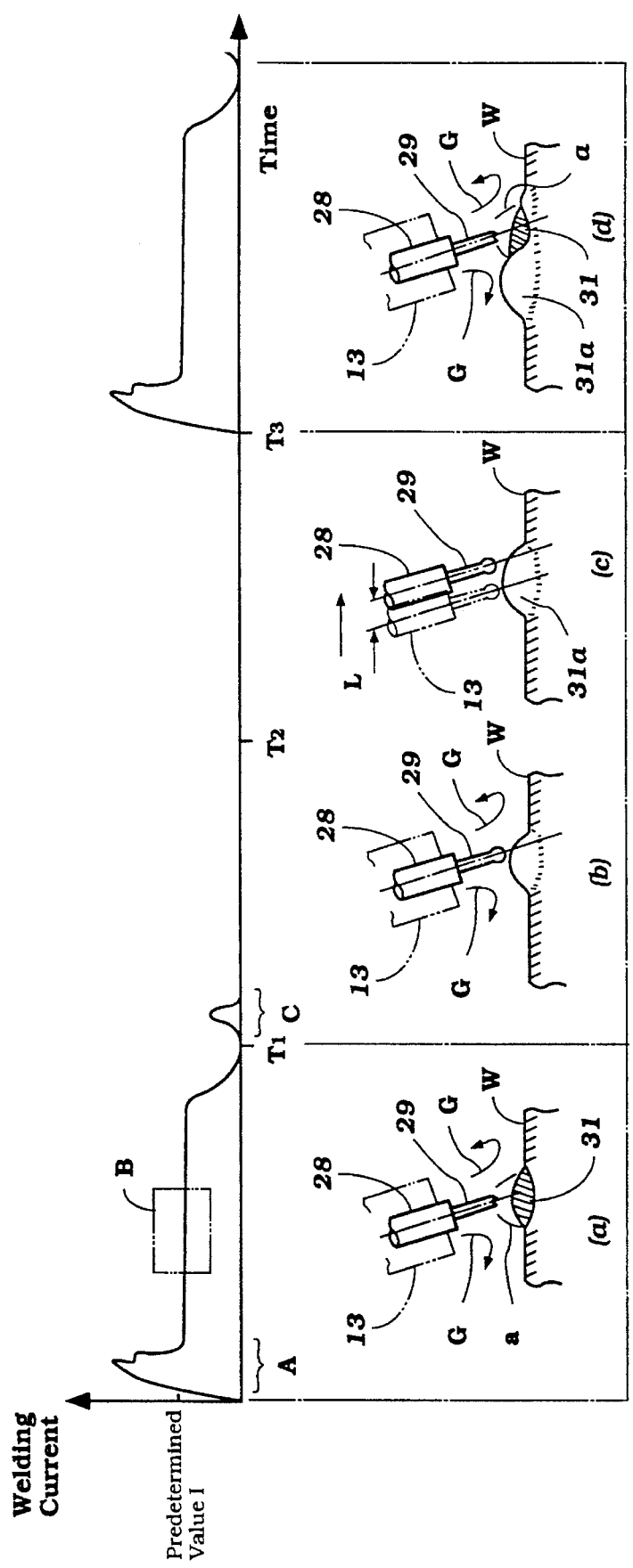
FIG. 2 is composite view showing the welding current and the condition of the weld and welding apparatus when forming a welded seam in accordance with the invention.

The establishment of the arc is determined at the step P-2 in FIG. 8. This time period is the point in time "a" as seen in FIG. 2 and is established by determining when the arc has been struck. As may be seen in the lower view of FIG. 2, the welding head 13 has a lower tip portion 28 from which the weld rod or wire, indicated at 29 protrudes. The arc is established between the end of the wire 29 and the base material W and the arc is indicated at "a" in this Figure. Throughout the welding technique, the inert gas is also supplied as shown at G to shield the area being welded. The amount of inert gas supplied during the operation can be varied as desired and in accordance with any control routine. Normally it can be at a constant flow but it may be at different flow rates during the welding or may be stopped at any time on times during the operation.

The molten weld puddle that is formed is indicated at 31 in. This welding operation is maintain during a pre-determined time period, as will be described at portion of this time period is indicated by the block b in FIG. 2 and will be now described by reference to FIGS. 3 and 4. As may be seen in FIG. 3, the actual welding current that flows through the wire 29 to the work piece W varies during the welding cycle under the operation of the control 15 with the welding current being shown in the curve in FIG. 3 and the actual condition between the weld rod 39 and the work piece W being shown in FIG. 4 with the corresponding points in both Figures being identified by the letters a, b, c and d.

Figure 3:
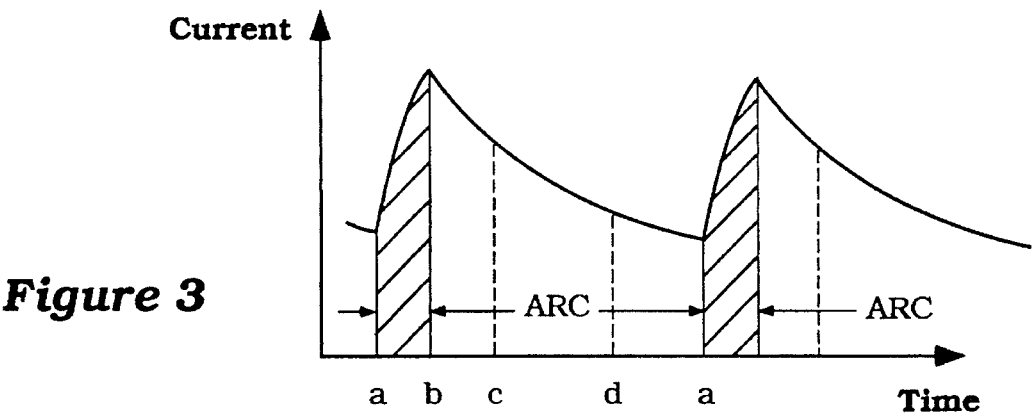
FIG. 3 is a graphical view showing the welding procedure being followed during welding and shows the welding current in relation to time.
Figure 4:
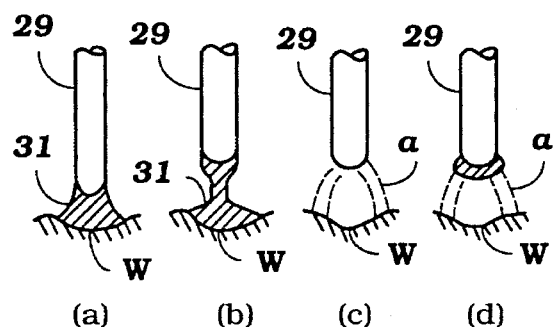
FIG. 4 shows three views a, b, c and d which indicate the condition of the weld at the points a, b, c and d of FIG. 3.

Once the arc has been stuck the tip of the wire 28 will melt during the time period a b and will come in contact with the material of the work pieces being welded W as shown in these two FIGS. (4a and 4b). Once the welded material comes into contact with the base piece there is a short circuit and the welding current rises abruptly as shown in FIG. 3. This change in the current while the short circuit is formed is indicated by the hatched area in FIG. 3 between the points a and b. As this continues, the molten material extending the weld rod 28 and the work piece W will constrict as shown in FIG. b and eventually it will drop off and form a void. This causes the molten material 31 to be formed as shown in FIG. 3 and specifically the portion a thereof.

When this occurs, the arc will continue at the point c and eventually the weld rod will begin to melt and form a molten segment again as shown in FIG. 4d with the welding current all falling off during this time period.

The amount of weld material 31 which is built up will depends upon the time period T1 set. During this operation, the welding head 13 is held in a fixed position by the robot 12. The time T1 may be determined by determining the amount of molten material that is to be built up before the arc is moved to the new location, as will now be described.

FIG. 8 shows how the controller determines if the arc producing time T1 has elapsed this being determined at the step P3. If the time T1 has not elapsed, the program repeats back to step P2 and the welding will continue until the time T1 has elapsed. When this is determined at the step P3, the welding robot 13 is switched off with the arc off time being shown at P4. This condition also appears in view b of FIG. 2 wherein it will be seen that the arc is now turned off and the molten pool of material 31 will begin to solidify. During this time, the shielding gas G may continue to flow. The shut off time of the arc at the point T1 is shown at the area c of FIG. 2 wherein a small amount of current may be supplied but not sufficient to establish an arc.

The arc off will be determined by the amount of solidification which desired and this can be determined by running a test weld to insure that there is adequate solidification to avoid too much heat generation when the arc is again reestablished. The arc welding time T1 has been described as a time duration but it is understood that the amount of welding accomplished can also be controlled by controlling the amount of arc energy supplied by detecting welding current and voltage so that the time function can also be related to the actual amount of heat applied by the voltage and current as mentioned.

After a pre-determined arc off time T2 then the welding robot 12 is energized so as to advance the head 13 and weld rod 29 to a new position indicated by the dimension L in FIG. 2c wherein the now solidified weld material is indicated at 31a. During this time the gas supply may be shut off or may be continued depending upon the desired result.

The advancing step of the welding head 13 is initiated at the point P6 as shown in FIG. 8 and this is continued at a predetermined speed or variable speed for a time period T3. Hence, at the step P7 the controller 25 determines if the advance time after when the arc has been switched off (T3)

has been established. If it has not, the program moves back to the step P6.

If, however, the advance time T3 has been met then the program moves to the step P8 to determine if the weld rod is clear of the weld material. That is, it is determined at the step P8 if the weld rod is stuck to the weld and this is determined by passing a current through the wire and detecting the amount of that current. If current is excessive, it is determined that the weld is defective and the weld rod has stuck to the weld and the program moves to the step SP9 so as to stop the welding operation.

If, however, no weld defect is determined at step P8, then the program moves on to the program step P10 to complete the welding by again reestablishing an arc as shown in FIG. 2d and begin establishing a further pool of molten material. As may be seen, this is done in the overlap of the previous solidified material 31a so as to provide a continuous weld bead as may be seen in FIGS. 5 and 6.

Figure 5:
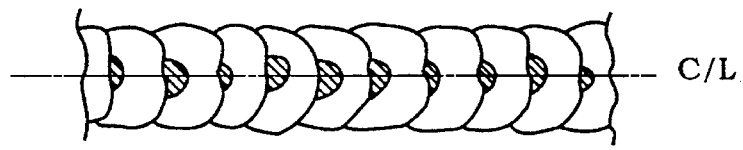
FIG. 5 is a top plan view of the finished welded seam on the top side.
Figure 6:
FIG. 6 is bottom plan view of the weld.

FIG. 5 is a top plan view showing the weld feed while the FIG. 6 is a bottom plan view showing the other side of the weld at the welded joint. Because the weld beads are overlapped weld strength is maximized and if the overlapping area is not great then the weld bead may become discontinuous. On the other hand, if two large overlapping occurs and the weld bead tends to become large and mound shaped. Hence, the amount of advancement L will determine the overlap and this must be determined by running a pass experimentally.

As may be seen in FIG. 5, the weld beads are quite regularly produced and have a somewhat scale or ripple pattern. This rippling is less obvious when the arc time off is set shorter. The hatched portion shows slugs of impurities which are formed on the beads and these are formed at the center of the puddling area. These occur mainly when steel or stainless steel is being welded. Because of the intermittent welding operation these slug masses are deposited in a row at approximately constant intervals because the welding operations are intermittent and there is cooling between each welding operation.

On the under side of the weld (FIG. 6) there will be some slight craters formed and these are shown by the shaded areas. These result from the cooling and pulling of the material from the center during solidification. These also occur at constant intervals along the weld.

Thus, comparing this method and the weld bead with that shown in FIG. 7 of the prior art, it is clear that no voids in the weld will occur and a continuous and strong weld is formed.

FIG. 10 Table 1 indicates the comparison of weld between thin sheets of metal, such as steel between the prior art continuous type welds and welding method and the present switch pulse welding method with various types of butt and lap joints being shown. With conventional welding techniques for butt joints and any form of gap whatsoever ends up melted holes formed through the joint. With lap joint conventional welding was possible with small gaps up to one millimeter but under cuts were observed in many locations.

On the other hand, with the switch pulse welding technique there is tolerance for gaps and good welds can be accomplished in butt joints even with gaps up to 0.5 millimeters. With lap joints, good welds can be accomplished with gaps even up to one millimeter with no under cutting.

Also, this Figure shows the tolerance possible in variations in millimeters from the aimed or desired center line C-L position of the weld. As shown in this Figure, the tolerance is much greater in accordance with this method then with the prior art type of methods.

The welding conditions for the information shown in Table 1 using this invention are a welding current of 50–60 amps and a welding voltage of 17.6–19.2 volts with the arc on time T1 arc off time T2 and advancing time T3 set so that the welding speed becomes 20–25 centimeters per minute and using a wire of 0.6 millimeters. The prior art weld in the table shows the results of the same condition for welding material welded by a known MAG welding process with a welding voltage of 37–53 amps, a welding voltage of 16.5–17.6 volts and 50–60 centimeters per minute welding speed.

Figure 9:
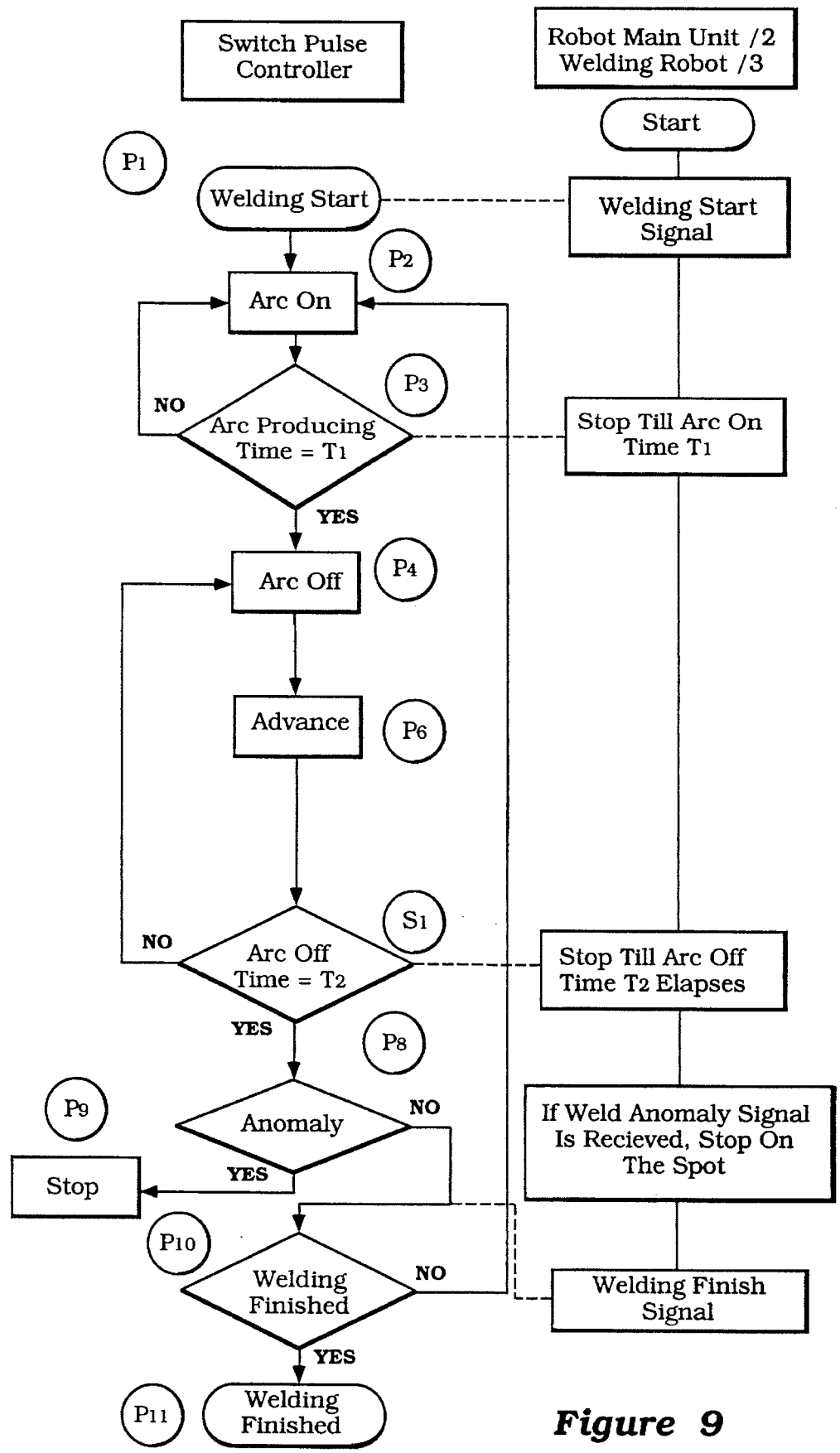
FIG. 9 is a block diagram, in part similar to FIG. 8, and shows another control routine which may be employed in conjunction with the invention.

In the method as thus far described, a time period T2 is permitted to elapse before the welding torch is moved. Of course, the welding torch can be moved immediately after turning off the arc but there may be some advantages in delaying the time of advancement so that more solidification can occur before the weld head 13 is actually advanced. Such a method is shown in the control routine of FIG. 9 wherein the steps which are the same as those of the program of FIG. 8 are identified by the same reference numerals. However, in this program the P5 is deleted and immediately after turning the arc off at the step P4 the program moves to the step P6 to advance the welding head. At a next step S1 it is determined if the arc off time T2 has been sufficient for the desired solidification to occur. When this has occurred the program moves on to the step P8 to run the abnormality check and complete the welding seam.

The described method has been practiced with steel base thin sheets of material but it should be readily obvious that other materials may be welded using this technique such as cast iron or carbon steel which may require pre-heating and using the MAG welding technique or MIG welding aluminum or aluminum alloy sheets is also possible. The welding of metal having high thermal conductivity such as copper, brass, aluminum and magnesium is also possible as is the welding of stainless steel, ferrite-based alloys, alloys of the martensitic family or alloys of precipitation hardening. In addition, welding of titanium by TIG welding can also be performed.

Thus, it should be readily apparent that the described welding apparatus and technique is highly useful in welding of very thin sheets of various materials and permits less accurate control over the edges of the material being welded and also of the welding control without adversely effecting the quality of the weld and in fact improving it. Of course, the preceding description is of preferred embodiments of the invention and various changes and modifications may be made without departing from the spirit and scope of the invention, as defined by the appended claims.

We claim:

1. An arc welding apparatus for performing butt and lap welds between edges of thin parallel extending sheets of material and along an edge of at least one of said sheets comprising an arc welder, a robot for moving said arc welder along a pre-determined welding path, and electrical control means for establishing an electrical arc between the weld rod and the material to be welded for sufficient time and intensity to form a first pool of molten material melting through the complete thickness of at least said one sheet, continuing the melting of material for a pre-determined time, discontinuing the melting of the material for a pre-determined time period to permit the pool to at least partially solidify, and operating said robot for moving said arc welder to establish a new arc at a point spaced from the first arc and to form a second pool within the periphery of the first pool and continuing this operation to form a weld seam.

2. An arc welding apparatus as set forth in claim 1 further including means for testing the abnormality of the weld at the completion of each solidifying period and before a successive arc is struck.

3. An arc welding apparatus as set forth in claim 2, further including means for terminating the welding in the event an abnormality in the weld is determined at the completion of a solidifying period.

4. An arc welding apparatus as set forth in claim 2, wherein the abnormality tested for is sticking of the welding rod to the solidified pool by testing the current and determining that the weld rod has stuck if the current is excessive.

5. An arc welding apparatus as set forth in claim 1 further including means for delivering an inert gas to the weld area at least during the time when the pool is established and a portion of the time when the pool is permitted to solidify.

6. An arc welding apparatus as set forth in claim 5 further including means for testing the abnormality of the weld at the completion of each solidifying period and before a successive arc is struck for performing butt and lap welds between edges of thin sheets of material.

7. An arc welding apparatus as set forth in claim 6, wherein the abnormality tested for is sticking of the welding rod to the solidified pool by testing the current and determining that the weld rod has stuck if the current is excessive.

8. An arc welding method using an arc welder comprising the steps of placing a pair of thin sheets in parallel relation with the edge of one sheet being adjacent a portion of the other sheet, establishing an arc between a weld rod and at least the one sheet to be welded to form a first pool of molten material melting through the complete thickness of at least said one sheet, continuing the melting of material for a pre-determined time, discontinuing the melting of the material for a pre-determined time period to permit the pool to at least partially solidify, and moving the weld head to establish a new arc at a point spaced from the first arc and to form a second pool within the periphery of the first pool and continuing this operation to form a weld seam.

9. An arc welding method as set forth in claim 8 further including testing the abnormality of the weld at the completion of each solidifying period and before a successive arc is struck.

10. An arc welding method as set forth in claim 9, wherein the welding is terminated in the event an abnormality in the weld is determined at the completion of a solidifying period.

11. An arc welding method as set forth in claim 9, wherein the abnormality tested for is sticking of the welding rod to the solidified pool by testing the current and determining that the weld rod has stuck if the current is excessive.

12. An arc welding method as set forth in claim 8 further delivering an inert gas to the weld area at least during the time when the pool is established and a portion of the time when the pool is permitted to solidify.

13. An arc welding method as set forth in claim 12 further including testing the abnormality of the weld at the completion of each solidifying period and before a successive arc is struck.

14. An arc welding method as set forth in claim 13, wherein the abnormality tested for is sticking of the welding rod to the solidified pool by testing the current and determining that the weld rod has stuck if the current is excessive.

* * * * *